Feb. 25, 1930.    E. A. NELSON    1,748,615
STEERING GEAR CONSTRUCTION
Filed May 21, 1928    2 Sheets-Sheet 1

INVENTOR.
EMIL A. NELSON
BY
ATTORNEY.

INVENTOR.
EMIL A. NELSON
BY
ATTORNEY.

Patented Feb. 25, 1930

1,748,615

UNITED STATES PATENT OFFICE

EMIL A. NELSON, OF DETROIT, MICHIGAN

STEERING-GEAR CONSTRUCTION

Application filed May 21, 1928. Serial No. 279,269.

This invention relates to steering gears for motor vehicles and the like, the principal object being the provision of an improved construction, simple in design, economical to manufacture, and efficient in operation.

Another object is to provide a steering gear having a minimum number of parts and a maximum amount of bearing surfaces whereby the reliability and the length of life of the device is increased over that of conventional constructions.

Another object is to provide a steering gear with novel means for reducing kick back through the same without sacrificing the free operation of the gear.

Another object is to provide a novel means for compensating for wear in a steering gear of the type described.

Another object is to provide a steering gear of the worm type in which the maximum diameter of the worm is utilized during normal straight driving of the vehicle of which it forms a part.

A further object is to provide a steering gear of the worm type in which the worm heel portion thereof is provided with a single tooth formed separately form its support whereby it may be made of a material highly resistant to wear.

The above being among the objects of the present invention the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views,—

Figure 1:
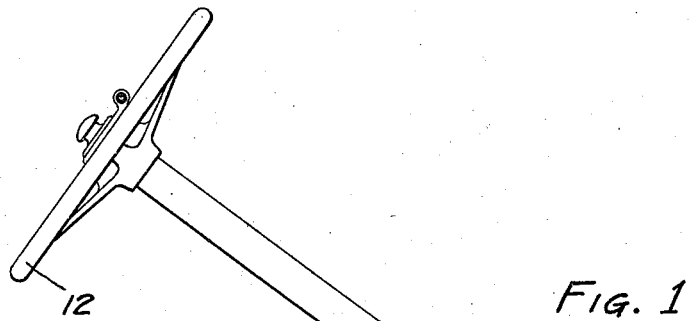
Fig. 1 is a side elevation of a steering gear constructed in accordance with the present invention.
Figure 2:
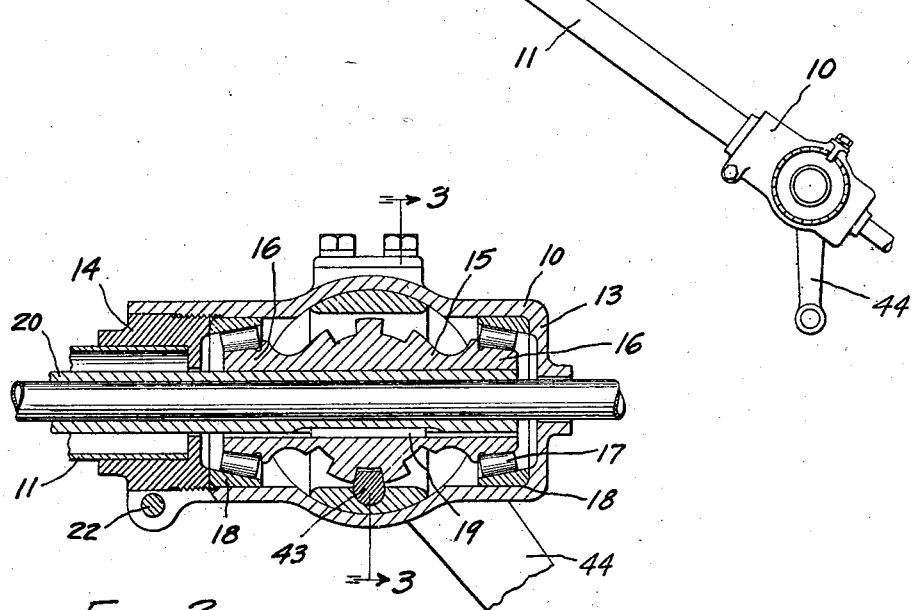
Fig. 2 is an enlarged vertical sectional view of the lower end of the steering gear taken through the axis of the post.
Figure 5:
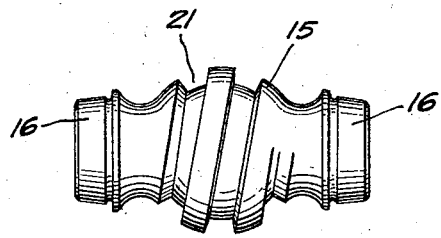
Fig. 5 is a side elevation of the worm member employed in the present invention.
Figure 3:
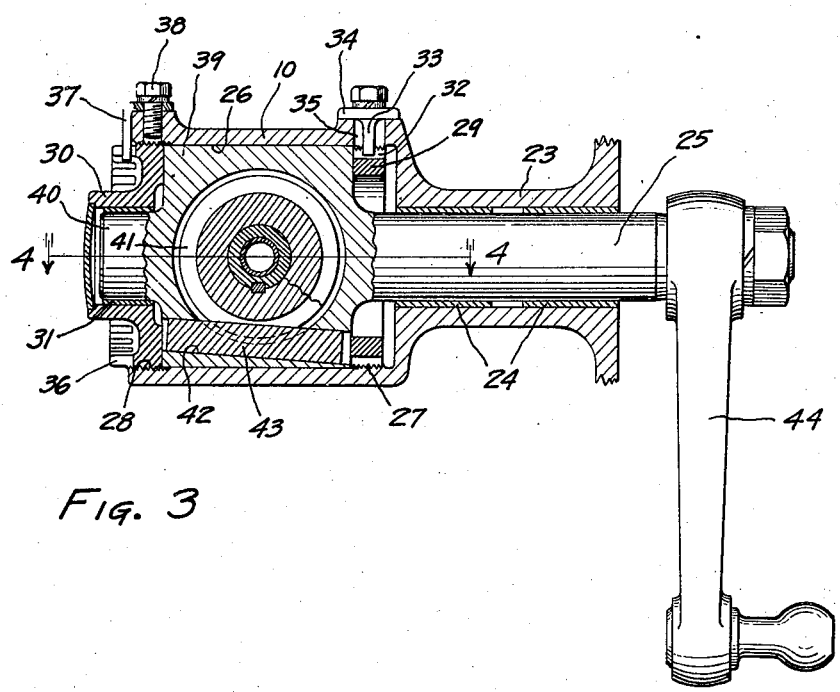
Fig. 3 is a vertical sectional view taken on the line 3—3 of Fig. 2.
Figure 4:
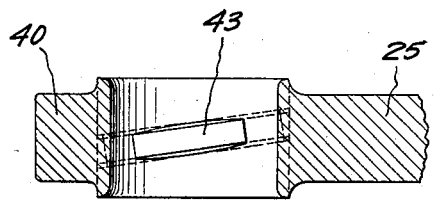
Fig. 4 is a fragmentary sectional view of the steering shaft taken as on the line 4—4 of Fig. 3.

I show in the accompanying drawings a steering gear of the type designed to be employed on motor vehicles comprising a housing 10 which carries the usual jacket 11 at the upper end of which is positioned the usual steering wheel 12. The housing 10 may be provided with an integral end wall 13 at its lower end and with a member 14 threaded into the opposite end thereof, the jacket 11 directly engaging the member 14 as shown. Within the housing 10 is a worm member 15 formed to provide bearing cones 16 at its opposite ends which are adapted to cooperate with the rollers 17 bearing against the races 18 which, in turn, are carried by the inner walls of the housing 10. The worm member 15 is secured by suitable means such as the key 19 against rotation to the steering tube 20 which extends therethrough and up through the jacket 11 to the steering wheel 12 to which it is suitably secured. As shown best in Fig. 5, the central portion of the worm member 15 is formed to a spherical shape in which relatively large worm grooves 21 are formed. The lead of the grooves 21 on the portion 15 may be constant, or may increase or decrease in degree away from the maximum diameter of the portion 15, as desired. The axial position of the worm member 15 is governed by the position of the races 18, the distance between which is adjustably controlled by the member 14 which may be locked in adjusted position in a conventional manner by the bolt 22 extending through the slotted end portion of the housing. As illustrated in Fig. 3, the housing 10 is extended laterally in one direction, as at 23, and such extended portion is provided internally with bushings 24 for the steering shaft 25 which is rotatably received therein. The housing 10 is formed with a cylindrical inner surface 26 whose axis is coincident with the axis of the steering shaft 25 and the inner and outer ends of the cylindrical wall 26 are threaded as at 27 and 28 respectively. A threaded collar 29 is received within the housing 10 in engagement with the threads 27 and is adjustable therein axially of the shaft 25. A threaded cap or cover member 30 threadably engages the threads 28 and is provided with a central bushing 31 in axial alignment with the shaft 25. The collar member 29 is notched as at 32 on its outer surface and a removable locking member 33 carried by the cap 34 extends through the slot 35 in the housing 10 and is adapted to engage one of the notches 32 so as to lock it in axially adjusted position. Upon removal of the cap 34 and member 33, a screw driver or other instrument may be inserted through the slot 35 to rotate the collar 29 so as to vary the axial position thereof. The cap or cover member 30 is provided with a plurality of axially parallel fingers 36 adjacent its periphery and the adjacent wall of the housing 10 is provided with a removable locking finger 37 secured thereto by a bolt 38, the finger 37 being adapted to engage the fingers 36 to lock the cap or cover member 30 in its rotated and therefore axially adjusted position with relation to the housing 10. The shaft 25 has formed thereon within the housing 10 a cylindrical portion 39 which extends into almost contacting relationship with the wall 26 and is of a length commensurate with the distance between the collar 29 and cap or cover member 30. The portion 39 is provided with a pilot or extension 40 at the end thereof opposite the shaft 25 which is received within the bushing 31 and therefore acts as an outboard bearing for the portion 39.

The cylindrical portion 39 is provided with an enlarged central opening 41, the axis of which intersects and is perpendicular to the axis of the portion 39 and within which the worm member 15 is freely received. The cylindrical portion 39 is provided with an opening 42 which extends from one end face to the other end face thereof and intersects the opening 41, the opening 42 being slightly inclined to the axis of the portion 35 in two directions, one direction being in accordance with the lead of the grooves 21 in the worm member 15 and the other with respect to the outer surface of the portion 39. Secured within the opening 42 is a tooth member 43 which is adapted to engage the groove 21 in the worm 15 and therefore serves as a portion of the worm wheel cooperating with the worm 15. Thus, when the worm 15 is rotated, the tooth 43 is caused to follow the lead of the groove 21 which it engages and thus causes the cylindrical portion 39 to rotate about its axis in accordance with the direction of rotation of the worm 15. The diameter of the opening 41 is such as to permit sufficient rotation of the portion 39 and shaft 25 about the worm 15 that the conventional amount of movement of the steering arm 44 secured to the end of the shaft 25 is obtainable. The tooth 43 being formed separately from the member 39, and being of a relatively simple form, permits it to be made of a material extremely resistant to wear, such as of that class of tool steel machinable only by grinding. This feature helps to make for long life of the device.

It will be noted that with this construction any wear that may occur between the worm and the tooth 43 may be compensated for by shifting the collar 29, as viewed in Fig. 3, to the left and following up such movement of the collar 29 by like movement of the cap or cover 30, thus moving the portion 39 and shaft 25 to the right so as to bring the tooth 43 into closer relationship with the worm, and the cap and cover 30 and collar 29 also cooperates with the portion 39 to control the permissible amount of axial movement of the portion 39. It will also be apparent that the member 14 controls the permissible amount of axial movement of the worm 15 with respect to the housing 10. The resulting simplicity of adjustment over conventional construction is readily apparent.

In practice I prefer to fill the interior of the housing 10 with the usual heavy lubricant. This lubricant not only lubricates the wearing surfaces of the device but covers the interior wall 26 and is carried between such wall and the portion 39. As before described, the external diameter of the portion 39 is but slightly smaller than the diameter of the wall 26 with the result that when the portion 39 is turned relative to the housing, a relative large area of lubricant on the wall 26 must be sheared during the turning movement. I provide this construction so that any shocks to which the wheels of the vehicle are subjected to and which are normally transmitted through the steering arm 44, shaft 25 and tooth 43 to the worm 15 and thence to the steering wheel 12, will be dampened due to the fact that in being so transmitted to the steering wheel 12, they must shear the large film of oil on the surface 26. I find that this feature materially dampens such shocks without materially interfering with the free operation of the steering gear itself.

It may also be noted that by this construction in which the worm engages an internal worm wheel, during normal straight driving, which constitutes by far the greatest percentage of driving of a vehicle, the maximum diameter of the worm is in engagement with the tooth member 43, so that any wear between the tooth member 43 and its cooperating groove 21 in the worm will allow a minimum of backlash to be apparent at the steering wheel 12.

Although I have shown in the accompanying drawings the axial line of the steering shaft 25 as perpendicular to and intersecting the axis of the worm 15, it will be readily apparent that where desirable the axis of the shaft 25 may be inclined to the axis of the worm, or the axial line of the shaft may be positioned out of intersecting relationship with respect to the axis of the worm any amount found desirable, the contour of the worm being varied in such cases to meet the particular requirements arising by such changes.

Formal changes may be made in the specific embodiment of the invention described without departing from the spirit or substance of the broad invention, the scope of which is commensurate with the appended claims.

What I claim is:

1. In combination, a rotatable shaft, a worm positioned perpendicularly to the axis of said shaft, and an extension carried by said shaft extending over said worm and provided with an internal type of tooth extending tangentially with respect to said worm and in engagement therewith.

2. In combination, a rotatable worm, a rotatable shaft positioned with its axial line perpendicular to and intersecting the axis of said worm, a part carried by said shaft extending over said worm, and a tooth extending tangentially with respect to said worm carried by said part in engagement with said worm.

3. In combination, a rotatable worm, a rotatable shaft positioned with its axial line at an angle to the axis of said worm, a part carried by said shaft bridging said worm, a pilot for said part on the side of said worm opposite said shaft, and a tooth extending tangentially with respect to said worm carried by said part in engagement with said worm whereby rotation of said worm causes rotation of said shaft.

4. In combination, a rotatable shaft, an enlarged portion on said shaft provided with an opening therein extending angularly with respect to the axis of said shaft, a worm member extending angularly with respect to the axis of said shaft and freely received in said opening, and a tooth extending tangentially with respect to said worm member carried by said enlarged portion in engagement with said worm.

5. In combination, a housing, a worm rotatably mounted in said housing, a shaft rotatably mounted in said housing with its axial line at an angle to the axis of and intersecting the surface of said worm, said shaft being provided with a part extending over said worm in freely spaced relation in respect thereto, and a tooth extending tangentially with respect to said worm carried by said part in engagement with said worm.

6. In combination, a housing, a pair of shafts rotatably mounted in said housing with their axial lines at an angle to each other, a worm secured to one of said shafts for equal rotation therewith, a part carried by the other of said shafts provided with a central opening in which said worm is freely received, and a tooth member carried by said member in a tangential direction with respect to said worm and exposed in said opening for engagement with said worm.

7. In combination, a housing, a pair of shafts rotatably mounted in said housing with their axial lines at an angle to each other, a worm secured to one of said shafts for equal rotation therewith, a part carried by the other of said shafts extending over said worm, and a tooth on said part engaging said worm, said part and said housing having cooperating surfaces adapted to be covered by a lubricant and providing damping means for shocks transmitted between said shafts.

8. In combination, a housing, a worm rotatably mounted therein, a shaft rotatably mounted in said housing with its axis at an angle to the axial line of said worm, said shaft being provided with an enlarged part provided with a cylindrically shaped outer surface, the adjacent inner surface of said housing extending into substantially contacting relationship with respect to said outer surface, said enlarged part extending over said worm, and a tooth on said part engaging said worm.

9. In combination, a housing, a worm rotatably mounted therein, a shaft rotatably mounted in said housing with its axial line at an angle to the axis of said worm, a part carried by said shaft extending over said worm, a tooth carried by said part in engagement with said worm, said tooth being inclined to the axis of said shaft, and means for adjusting the axial position of said part whereby to control the clearance between said tooth and said worm.

10. In combination, a housing, a worm rotatably mounted therein, a shaft rotatably mounted in said housing with its axial line at an angle to the axis of said worm, an internal worm wheel part carried by said shaft bridging said worm and provided with a tooth engaging said worm, and means carried by said housing adjustable axially of said shaft for controlling the position of said tooth transversely to said worm.

11. In combination, a housing, a worm rotatably mounted therein, a shaft rotatably mounted in said housing with its axial line at an angle to the axis of said worm, a part on said shaft bridging said worm, an opening in said part tangentially disposed relative to said worm intersecting the inner surface thereof, and a tooth member in said opening engaging said worm.

12. In combination, a housing, a worm rotatably mounted therein, a shaft rotatably mounted in said housing with its axial line at an angle to the axis of said worm, an enlarged part on said shaft provided with an opening in which said worm is received, a second opening in said part tangentially disposed relative to said worm intersecting the first mentioned opening, and a tooth member received within said second member engaging said worm within said first mentioned opening.

13. In combination, a housing, a worm rotatably mounted therein, a shaft rotatably mounted in said housing with its axial line at an angle to the axis of said worm, an enlarged part on said shaft provided with an opening in which said worm is received, a second opening in said part intersecting the first mentioned opening, and a tooth member received within said second member engaging said worm within said first mentioned opening, said tooth member extending at an angle to the axis of said shaft whereby axial movement of said shaft will vary the clearance between said tooth and said worm.

EMIL A. NELSON.